Figure 1:
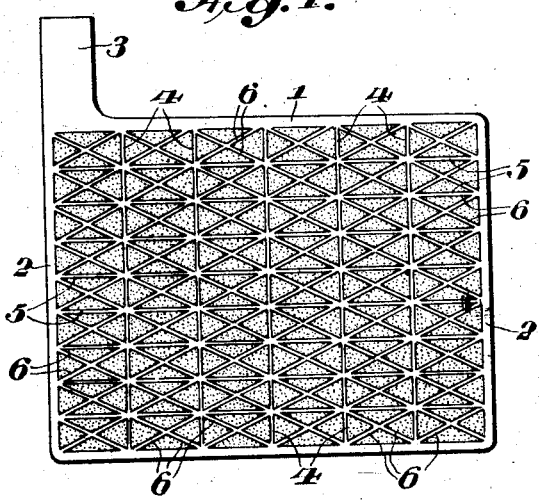

Aug. 18, 1925.

W. H. CRISSEY 1,550,347

BATTERY GRID

Original Filed Sept. 18, 1920

INVENTOR.
Walter H. Crissey,
BY
J. Stuart Freeman,
ATTORNEY.

Patented Aug. 18, 1925.

1,550,347

UNITED STATES PATENT OFFICE.

WALTER H. CRISSEY, OF PHILADELPHIA, PENNSYLVANIA, ASSIGNOR, BY MESNE ASSIGNMENTS, TO LYONS STORAGE BATTERY CO., A CORPORATION OF DELAWARE.

BATTERY GRID.

Application filed September 18, 1920, Serial No. 411,309. Renewed July 13, 1925.

*To all whom it may concern:*

Be it known that I, WALTER H. CRISSEY, a citizen of the United States, residing at Philadelphia, in the county of Philadelphia and State of Pennsylvania, have invented certain new and useful Improvements in Battery Grids, of which the following is a specification.

The object of this invention is to provide an improved grid for secondary or storage batteries, wherein the construction demands an efficient grid, operative to support and maintain in permanent uniform association the active chemical element, or elements.

Storage batteries are in the majority of cases subject to jogging and jolting, which alone would tend to loosen the hold of the grid upon the active element, with a consequent increase in the internal resistance of the battery and finally complete destruction of the latter, but in addition to these physical deteriorating forces there is the chemical action which takes place during charging and discharging of the battery, and which with other than the best care tends eventually to warp the active element forming a part of the grid in such manner as to free the one from the other.

Another factor entering into the design of battery grids is the structure of the supporting member thereof, which in one direction must comprise sufficient electrically conductive material to decrease to a minimum the internal resistance, while on the other hand occupying the least possible amount of space in order to provide room for a maximum amount of the chemically active material, it being hypothetically assumed that the metal used for the grid is primarily able to resist the action of the electrolyte thereon, and that the construction of the several parts of the grid has been so designed that the greatest rigidity will be insured substantially regardless of the character of use to which it is subjected and the rate of electric charging and discharging carried on.

More specifically, the design of this improved grid comprises the formation of a frame portion from which the usual connecting post preferably integrally extends, while the space between the opposite sides of said frame is crossed by series of parallel ribs forming rectangles, each of which latter is divided into triangles by ribs which extend diagonally thereacross and intersect at substantially the central points of the rectangles, these said diagonal ribs forming continuations of each other in obliquely adjacent rectangles, thus together forming substantially direct metallic electrical connection of every part of the grid with the corner portion from which the connecting post extends.

Furthermore, the rectangular and triangular rib construction upon one side thereof is so positioned with respect to the other side that one rectangle of one side is centrally disposed with respect to the intersecting ribs between four rectangles upon the opposite side, which makes the diagonally extending ribs upon one side coincide in position with the corresponding ribs upon the other, but when the frame before being filled with the chemically active material is viewed from one side, the vertical and horizontal ribs directly exposed to the opposite side are visible through and centrally disposed with respect to the respective triangles.

And as the cross-section of each rib, whether vertically, horizontally, or diagonally extending, tapers from the center rib towards the outer surfaces thereof, the usual chemically active material generally applied in the form of a paste will be enabled to fill the several triangles upon each side and unite in the center, and dove-tail around the horizontally and vertically extending ribs in between the diagonally extending ribs, thus insuring a permanent unitary relation between said active material and the grid structure, practically regardless of the kind of usage or treatment to which the battery containing such grid will be later subjected.

Figure 3:
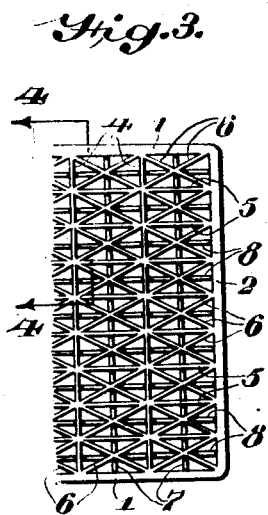
Figure 2:
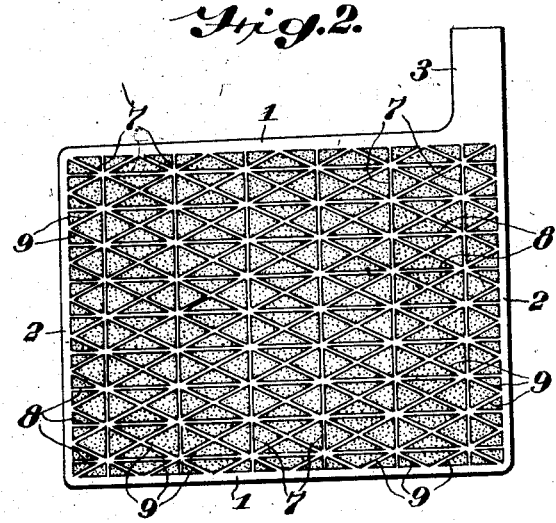
Figure 4:
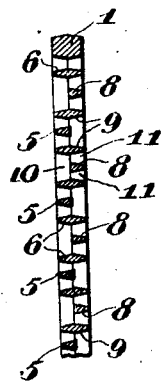

The invention additionally covers further details of construction as hereinafter fully described when read in conjunction with the accompanying drawings, in which Fig. 1 is an elevation of one side of the improved grid containing the usual active material; Fig. 2 is a similar view of the opposite side of such grid; Fig. 3 is a fragmentary portion of the same grid before the active material is united therewith; and Fig. 4 is a section on the line 4—4 of Fig. 3.

Referring to the drawings, the improved grid comprises a rectangular frame, having substantially horizontally extending sides 1, connected at their end portions by substantially vertically extending sides 2, while from one corner of said frame there is provided an integral extension 3, for the purpose of affording both mechanical and electrical connections with the grid after the same is immersed in the usual electrolyte.

Viewed from one side as in Fig. 1, the grid-frame is crossed by a series of equally spaced vertically extending ribs 4, and also by equally spaced horizontally extending ribs 5, which together form complete rectangles throughout the area between the sides of the grid-frame. Additionally, there are provided two series of diagonally extending ribs 6, the ribs of each series being spaced equal distances apart and so arranged as to cross the respective rectangles above described diagonally from corner to corner, and the rib of one series and the rib of the other series in a given rectangle intersect each other at the center of said rectangle, to form four triangular spaces as clearly shown by the drawing.

Viewed from the opposite side the grid-frame is illustrated in Fig. 2 as comprising the vertically extending ribs 7 and horizontally extending ribs 8, together with the two sets of diagonally extending ribs 9, all of which are so related as to form rectangles and triangles in a pattern exactly similar to that illustrated on the obverse as before described, except that this reverse design is so positioned that each rectangle is centrally positioned with repect to the vertically and horizontally extending ribs separating four adjacent rectangles in the obverse design, which relationship is clearly understood by the examination of Fig. 3 of the drawings. Thus with the rectangles out of alignment in the relative positions described, the diagonally extending ribs will be found to coincide and form a rigid lattice-work covering the entire area between the respectively opposite sides of the grid-frame.

This lattice-work has been found to perform the function of insuring and indefinitely preserving the original rigid plane shape of the grid regardless of the treatment to which it may be subjected, both in jogging and jolting as in automobile use, and electrically in rapid charge and discharge, and also as affording a substantially direct metallic electrical connection for every part of the grid to that portion of the frame from which extends the integral extension 3.

Having insured the complete reinforcement of the grid and frame mechanically, the peculiar arrangement of the vertical and horizontal ribs upon one side with respect to those upon the other provides a means for postively securing and locking permanently in unitary position the chemically active material with respect to the metallic portion of he grid. To illustrate, the active material in paste form is forced into the enlarged cavity 10 upon one side of the grid and smaller cavities 11 connected with said first cavity, so that the paste unites in the three cavities to form an integral unit, which, after having been permitted to thoroughly set, can obviously not be removed in the direction of the horizontally extending rib, and cannot be removed in the opposite direction because of the dove-tailed cross-section of that portion of the active material which lies within the recess 11 between the horizontal rib 8 and neighboring diagonally extending ribs 9.

Having thus described my invention, what I claim and desire to protect by Letters Patent of the United States is:—

1. A grid for secondary batteries comprising a frame, opposite sets of spaced parallel ribs arranged at substantially right angles to each other, and opposite sets of spaced parallel ribs angularly arranged with relation to the first named ribs and diagonally arranged with relation to said frame.

2. A grid for secondary batteries comprising a frame, opposite sets of spaced parallel ribs arranged at substantially right angles to each other and parallel to the respective sides of said frame, and opposite sets of spaced parallel ribs angularly arranged with relation to the first named ribs, and diagonally arranged with relation to said frame.

3. A grid for secondary batteries comprising a frame, and opposite sets of spaced parallel ribs, said ribs forming opposite sets of rectangles, the rectangles of one set being arranged in staggered relation to those of the opposite set.

4. A grid for secondary batteries comprising a frame, opposite sets of spaced parallel ribs arranged diagonally of said frame and forming opposite sets of quadrilaterals, and other opposite sets of spaced parallel ribs, each of said last named ribs extending through opposite corners of a row of quadrilaterals and thus forming rows of triangles.

5. A grid for secondary batteries comprising a frame, opposite sets of spaced parallel ribs arranged diagonally of said frame and forming opposite sets of quadrilaterals, the quadrilaterals of one set being arranged in staggard relation to those of the opposite set, and other opposite sets of spaced parallel ribs, each of said last named ribs extending through opposite corners of a row of the quadrilaterals and thus forming rows of triangles.

6. A double-lattice grid, comprising horizontally and vertically extending ribs forming rectangles, and sets of diagonally extending ribs intersecting each other within each of said rectangles, the rectangles of one lattice being disposed in staggered relation both vertically and horizontally with respect to the rectangles of the other lattice.

7. A double-lattice grid, comprising horizontally and vertically extending ribs forming rectangles, and diagonally extending ribs intersecting said rectangles, the rectangles of one lattice being disposed in staggered relation both vertically and horizontally with respect to the rectangles of the other lattice, and the diagonally extending ribs of one lattice being integrally connected throughout their extent with the corresponding ribs of the other lattice, and the vertically and horizontally extending ribs of one lattice being freely suspended except where they intersect the respective horizontally and vertically extending ribs of the other lattice.

In testimony whereof I have affixed my signature.

WALTER H. CRISSEY.